United States Patent
Furuya

(10) Patent No.: US 7,684,687 B2
(45) Date of Patent: Mar. 23, 2010

(54) IMAGING APPARATUS HAVING MULTIPLE OPTICAL SYSTEMS

(75) Inventor: Hiroaki Furuya, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 587 days.

(21) Appl. No.: 11/567,863

(22) Filed: Dec. 7, 2006

(65) Prior Publication Data

US 2008/0025712 A1 Jan. 31, 2008

(30) Foreign Application Priority Data

Jul. 31, 2006 (JP) .............................. 2006-208005

(51) Int. Cl.
- G03B 17/00 (2006.01)
- G03B 41/00 (2006.01)
- H04N 5/222 (2006.01)

(52) U.S. Cl. .................... 396/88; 396/322; 348/333.02; 348/333.05

(58) Field of Classification Search .................... 396/85, 396/88, 322, 325, 333, 379, 60; 348/222.1, 348/333.02, 333.05, 240.99, 240.1–240.3, 348/262

See application file for complete search history.

(56) References Cited

U.S. PATENT DOCUMENTS

| 2003/0020814 A1* | 1/2003 | Ono ........................ 348/220.1 |
| 2004/0174444 A1* | 9/2004 | Ishii ........................ 348/240.1 |
| 2006/0044396 A1* | 3/2006 | Miyashita et al. ...... 348/207.99 |

FOREIGN PATENT DOCUMENTS

JP 2000-078445 3/2000

* cited by examiner

*Primary Examiner*—W. B. Perkey
*Assistant Examiner*—Minh Q Phan
(74) *Attorney, Agent, or Firm*—Thomas J. Strouse; Peyton C. Watkins

(57) ABSTRACT

To enable easy ascertainment of operating status of an imaging device having multiple optical systems. The imaging apparatus has a first imaging optical system and a second imaging optical system. When the two optical systems are actuated simultaneously, an image captured through the first imaging optical system and an image captured through the second imaging optical system are displayed side by side on an LCD, and an indicator is displayed concurrently on the LCD. The LCD displays a zoom position of each of the optical systems as well as the operating statuses of the optical systems.

8 Claims, 14 Drawing Sheets

IMAGING APPARATUS HAVING MULTIPLE OPTICAL SYSTEMS

CROSS REFERENCE TO RELATED APPLICATIONS

This application claims priority to Japanese Patent Application No. 2006-208005 filed on Jul. 31, 2006, which is incorporated herein by reference in its entirety.

FIELD OF THE INVENTION

The present invention relates to an imaging apparatus having multiple optical systems, and more particularly, to display control of operating statuses of the multiple optical systems.

BACKGROUND OF THE INVENTION

Monitoring systems, and the like, have often employed parallel display of images captured by multiple cameras on a display device or enlarged display of only an image of an arbitrary camera among the plurality of cameras on a display device. Meanwhile, a camera having multiple imaging optical systems disposed in a single camera housing has been proposed. A challenge to be met by such a camera is how to display images captured by the respective imaging optical systems on an LCD. Multiple imaging optical systems are divided into first imaging optical systems and second imaging optical systems. The first imaging optical systems are assumed to be of relatively-wide angle, and the second imaging optical systems are assumed to be of relatively narrow angle (telephotographic). When a single subject is imaged with the first and second imaging optical systems, an entire image and a fragmentary-enlarged image are acquired. How to display these images poses a challenge.

Japanese Patent Publication Laid-Open No. 2000-78445 discloses a digital camera which simultaneously displays an entire image and an enlarged image on a display section.

When a digital camera has a plurality of optical systems, there may be a case where some users desire to display only an entire image or only an enlarged image, as well as a case where some users desire to simultaneously display merely an entire image and an enlarged image. Moreover, there can be a variety of modes; for instance, a mode where imaging is effected by means of driving only the first imaging optical systems; a mode where imaging is effected by means of driving only the second imaging optical systems; a mode where imaging is effected by means of simultaneously driving the first imaging optical systems and the second imaging optical systems; and the like. The user is desired to readily, visually ascertain the variety of modes and to be able to readily select the operating mode.

SUMMARY OF THE INVENTION

The present invention provides an imaging apparatus including multiple optical systems which enables easy visual ascertainment of operating statuses of the optical systems.

The present invention provides an imaging apparatus having multiple optical systems, comprising:

a first imaging optical system;

a second imaging optical system differing from the first imaging optical system in terms of an angle of view, the first imaging optical system having a first zoom lens for zooming purpose, the second imaging optical system having a second zoom lens for zooming purpose, and the first zoom lens and the second zoom lens having a plurality of drive modes; and display control means for showing an indicator which shows a zoom position of at least any of the first zoom lens and the second zoom lens in accordance with a pattern corresponding to each of the drive modes.

In one embodiment of the present invention, the plurality of drive modes include a synchronous mode of synchronously actuating the first zoom lens and the second zoom lens, and an individual mode of individually actuating the first lens and the second lens. The indicator shows a status of synchronization between the first zoom lens and the second zoom lens achieved in the synchronous mode. The indicator shows a zoom position of the first zoom lens and a zoom position of the second zoom lens achieved in the synchronous mode.

The present invention enables easy, visual ascertainment of an operating status of the optical system by means of the indicator, thereby enhancing operability.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTION OF THE INVENTION

Embodiments of the present invention will be described hereinbelow by reference to the drawings.

Figure 1:
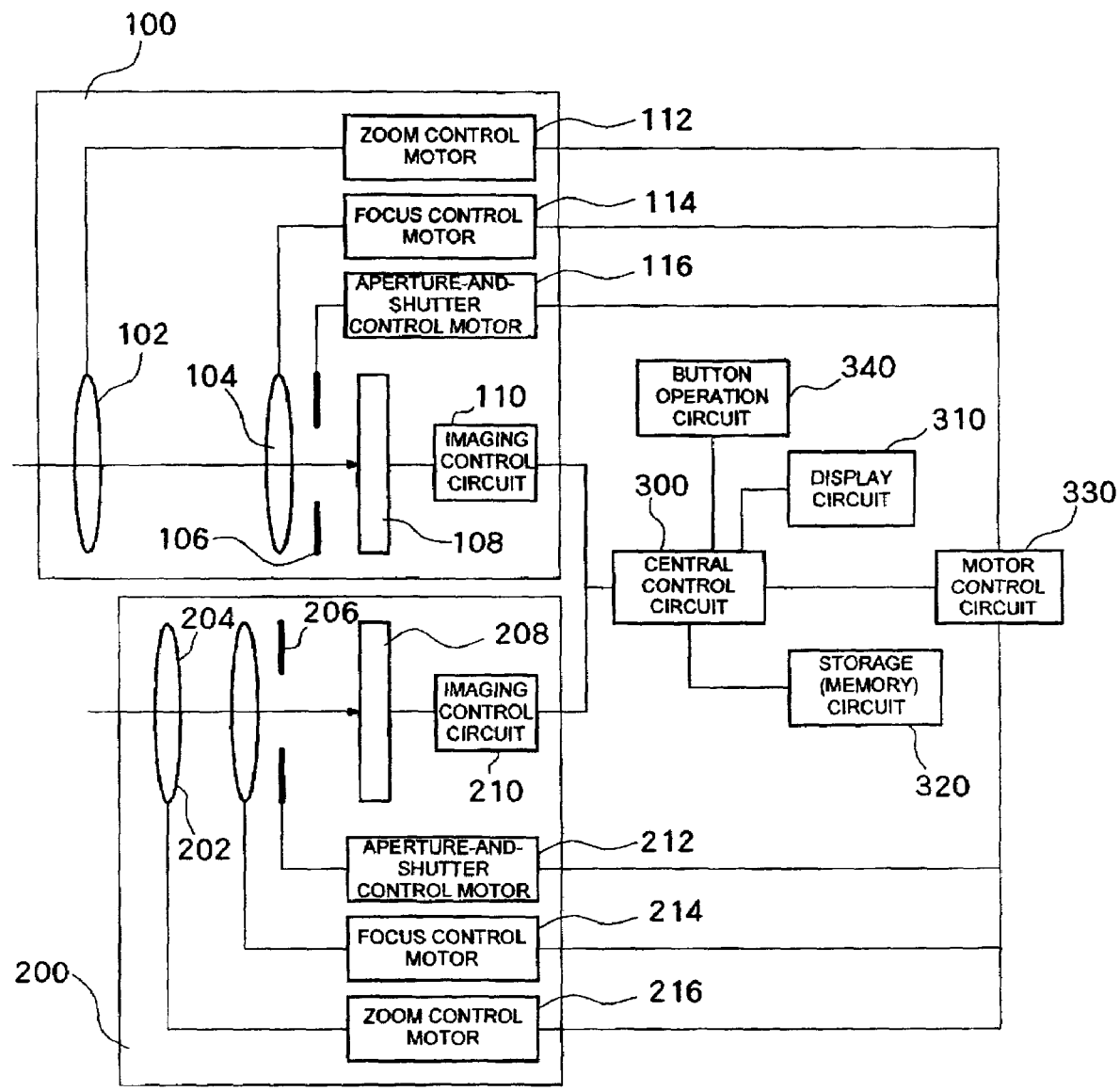
FIG. 1 is a block diagram of a digital camera according to an embodiment of the present invention.

FIG. 1 shows a block diagram of a digital camera according to an embodiment of the present invention. The digital camera comprises two optical systems; i.e., a first imaging optical system 100 and a second imaging optical system 200.

The first imaging optical system 100 comprises a first zoom lens (or a first group of zoom lenses) 102; a first focus lens (or a first group of focus lenses) 104; a first aperture-and-shutter 106; and a first image sensor 108. An image of a subject is formed on the first image sensor 108 by means of the first zoom lens 102 and the first focus lens 104. An imaging control circuit 110 controls driving of the first image sensor 108; subjects an image signal output from the first image sensor 108 to analog-to-digital conversion; and sends the thus-converted image signal to a central control circuit 300. The first zoom lens 102 is driven in the direction of an optical axis by means of a zoom control motor 112; the first focus lens 104 is driven in the direction of the optical axis by means of a focus control motor 114; and the first aperture-and-shutter 106 is driven by an aperture-and-shutter control motor 116. The motors 112, 114, and 116 are controlled by a motor control circuit 330. The first imaging optical system can be equipped with a zoom lens having a 35 mm film equivalent focal length of 39 mm to 117 mm. The first image sensor 108 is formed from a CCD and a CMOS; converts the image of the subject into an image signal (a first image signal); and outputs the image signal.

The second imaging optical system 200 comprises a second zoom lens (or a second group of zoom lenses) 202; a second focus lens (or a second group of focus lenses) 204; a second aperture-and-shutter 206; and a second image sensor 208. The image of the subject is formed on the second image sensor 208 by means of the second zoom lens 202 and the second focus lens 204. An imaging control circuit 210 controls driving of the second image sensor 208; subjects an image signal output from the second image sensor 208 to analog-to-digital conversion; and sends the thus-converted image signal to the central control circuit 300. The second zoom lens 202 is driven in the direction of the optical axis by means of a zoom control motor 216; the second focus lens 204 is driven in the direction of the optical axis by means of a focus control motor 214; and the second aperture-and-shutter 206 is driven by an aperture-and-shutter control motor 212. The motors 212, 214, and 216 are controlled by the motor control circuit 330. The second imaging optical system can be equipped with a zoom lens having a 35 mm film equivalent focal length of 130 mm to 390 mm. The second image sensor 208 is formed from a CCD and a CMOS; converts the image of the subject into an image signal (a second image signal); and outputs the image signal. The first image sensor 108 and the second image sensor 208 may have the same number of pixels or different numbers of pixels.

The central control circuit (CPU) 300 receives as inputs the first image signal output from the first imaging optical system 100 and the second image signal output from the second imaging optical system 200; subjects the image signals to various image processing operations; namely, separation between a brightness signal and a color signal, edge processing, y correction, white balance adjustment, JPEG compression processing, and the like; and outputs the processed image signals to a display circuit 310, such as an LCD, or a storage circuit 320 such as flash memory or the like. The central control circuit 300 processes the first image signal or the second image signal or both the first and second image signals, and outputs the thus-processed signal(s) to the display circuit 310 or the storage device 320. Operation of the central control circuit 300 is determined by a command signal issued by a button operation circuit 340. The button operation circuit 340 is formed from a plurality of user-operational buttons. The user selectively determines whether to bring the first imaging optical system 100 or the second imaging optical system 200 into an operating state. The central control circuit 300 processes the image signal output from the selected imaging optical system; and outputs the thus-processed image signal to the display circuit 310 or the storage circuit 320. Concurrently, the central control circuit 300 prepares an indicator showing the operating status of the first imaging optical system 100 and the operating status of the second imaging optical system 200, and displays the thus-prepared indicator on the display circuit 320. The indicator is displayed on the display circuit 310 along with a captured image. By means of visually ascertaining the indicator, the user can visually ascertain the operating status of the first imaging optical system and the operating status of the second imaging optical system; more specifically, which one of the first imaging optical system and the second imaging optical system is in operation, the zoom position of each of the first and second imaging optical systems, and the status of synchronization between the first imaging optical system and the second imaging optical system. The specific mode of the indicator will be described later.

Figure 2:
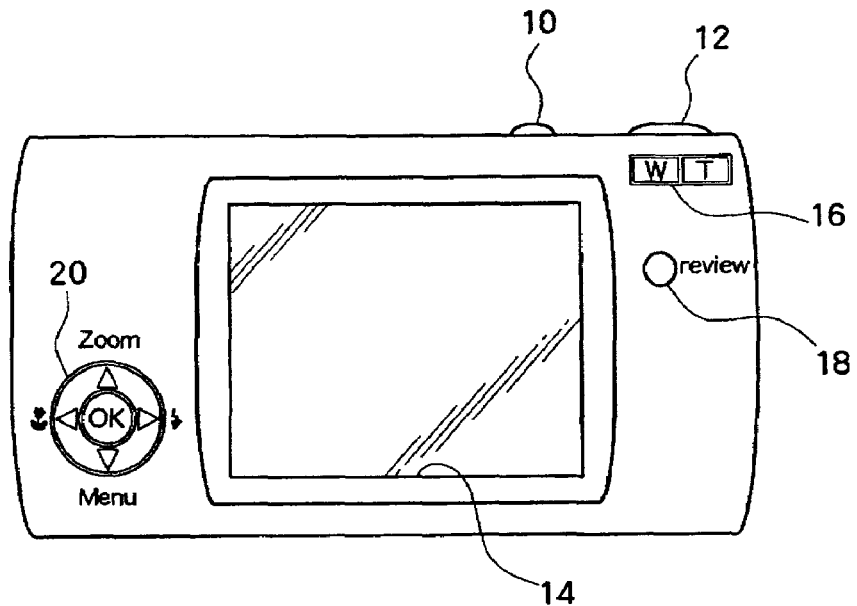
FIG. 2 is a rear view of the digital camera.

FIG. 2 shows a rear view of the digital camera. A power button 10 and a release button 12 are provided on the upper surface of the digital camera. An LCD 14, a zoom button 16, and a review button 18 are provided on the back of the digital camera. The zoom button 16 has a wide button to be operated when setting is made to a wide-angle side (WIDE) and a telephotography button to be operated when setting is made to a narrow-angle side (TELE). The review button 18 is operated when a captured image is displayed on the LCD 14. In addition to these buttons, a four-way key 20 which enables operations in four directions and OK operation is provided on the back of the digital camera. The four-way key 20 is a component of the button operation circuit 340 shown in FIG. 1; and enables four settings; namely, a zoom mode setting, a menu display, a strobe setting, and a close-up mode setting. Particularly, in the zoom mode setting, any one of the following is selectively set.

(1) A synchronous mode in which the first imaging optical system and the second imaging optical system are driven as if they were a single imaging optical system (hereinafter called a "basic drive mode").

In this mode, the first imaging optical system and the second imaging optical system are sequentially driven. At a point in time when the first imaging optical system has reached a telephotography end position, switching is automatically made from the first imaging optical system to the second imaging optical system. An image captured by the driven optical system is displayed on the LCD 14.

(2) A simultaneous mode in which the first imaging optical system and the second imaging optical system are simultaneously driven.

A mode in which images acquired by both optical systems are displayed on the LCD 14.

(3) An individual mode in which either the first imaging optical system or the second imaging optical system is individually driven.

In this mode, images captured by both optical systems are displayed on the LCD 14, and either of the optical systems can be driven individually (without involvement of synchronization with the other optical system).

The central control circuit 300 processes the image signal in the mode selected by the four-way key 20; prepares an indicator corresponding to each of the modes; and displays the thus-prepared indicator on the display circuit 310, i.e., the LCD 14.

Figure 3:
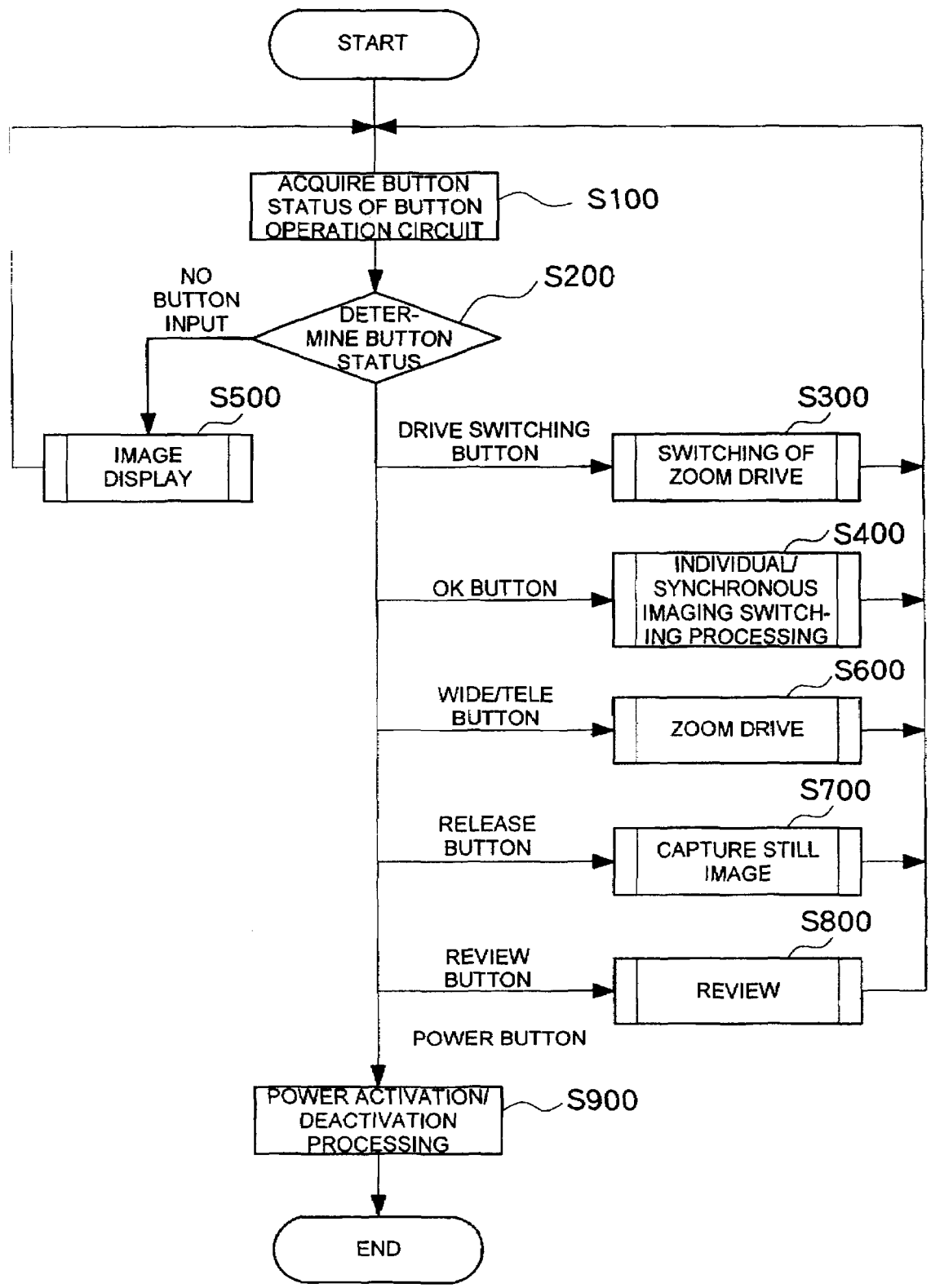
FIG. 3 is a flowchart of overall processing performed in the present embodiment.

FIG. 3 shows a flowchart of overall processing performed in the present embodiment. The central control circuit 300 acquires the button status of the button operation circuit 340 (S100), and determines the thus-acquired button status to thus switch processing (S200). Specifically, when the button is not newly operated, an image corresponding to the current setting is displayed (S500). Meanwhile, when the button is actuated and the thus-actuated button is for switching the zoom mode of the four-way key 20, processing proceeds to processing for switching the zoom mode (S300). In this processing, any one of the synchronous mode, the simultaneous mode, and the individual mode is selectively set. Moreover, when the actuated button is an OK button of the four-way key 20, processing proceeds to individual/synchronous imaging switching (S400). In this processing, a determination is selectively made as to whether two screens to be displayed on the LCD 14 in the individual mode or the simultaneous mode are captured concurrently or individually. When the actuated button is the zoom button 16, processing proceeds to zoom drive operation where either the first zoom lens 102 of the first imaging optical system 100 or the second zoom lens 202 of the second imaging optical system 200 or both of them are driven in accordance with the zoom button 16 (S600). When the actuated button is the release button 12, processing proceeds to processing for capturing an image (S700). When the actuated button is the review button 18, processing proceeds to review processing for displaying the captured image on the LCD 14 (S800). When the actuated button is the power button 10, processing proceeds to processing for activating or deactivating the power source (S900).

Figure 5:
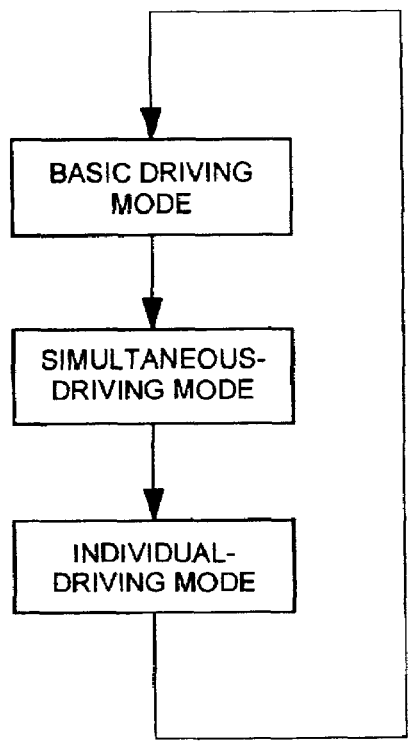
FIG. 5 is a descriptive view showing the transition of a zoom-driving mode.
Figure 4:
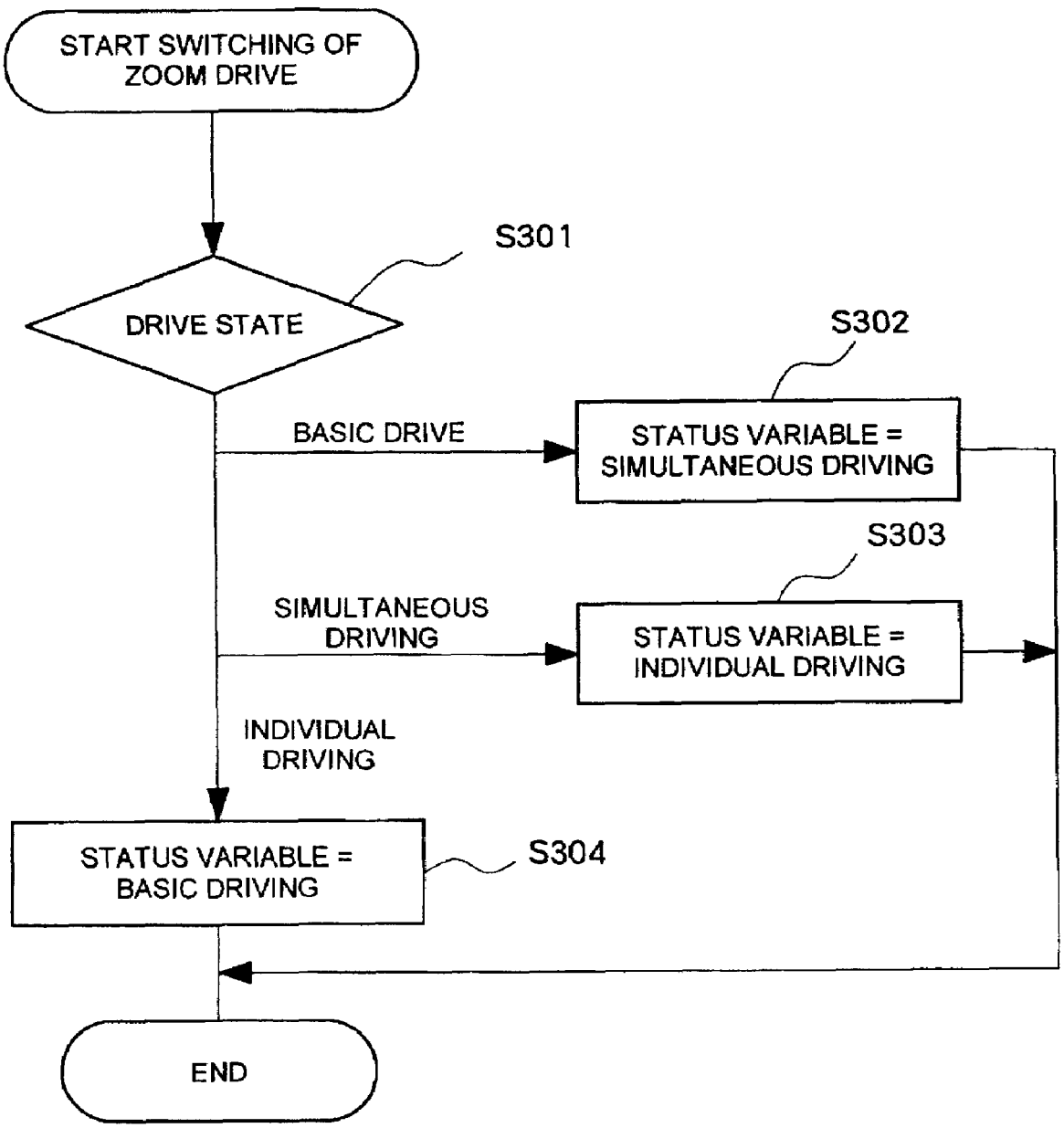
FIG. 4 is a flowchart of zoom drive switching operation.

FIG. 4 shows a detailed flowchart of zoom drive switching (S300) shown in FIG. 3. The zoom drive mode is switched by means of depressing an upper key (zoom) of the four-way key 20. Every time depressing action is performed, the drive mode cyclically changes in sequence of the basic drive mode, the simultaneous drive mode, and the individual drive mode. When the four-way key is depressed, the current drive status is determined (S301). When the current drive status is a basic drive mode, the status variable is set to simultaneous drive, and the drive status is shifted to the simultaneous drive mode (S302). The status variable is stored as a data retention variable. Likewise, when the drive status is simultaneous drive, the status variable is set to individual drive, and the drive status is shifted to the individual drive mode (S303). When the drive status is individual drive, the status variable is set to basic drive, and the drive status is shifted to the basic drive mode (S304). FIG. 5 shows a transition diagram of a zoom drive mode. As a matter of course, the sequence of switching of the zoom drive mode can be arbitrarily set but may also be set in sequence of the basic drive mode, the individual drive mode, and the simultaneous drive mode.

Figure 6:
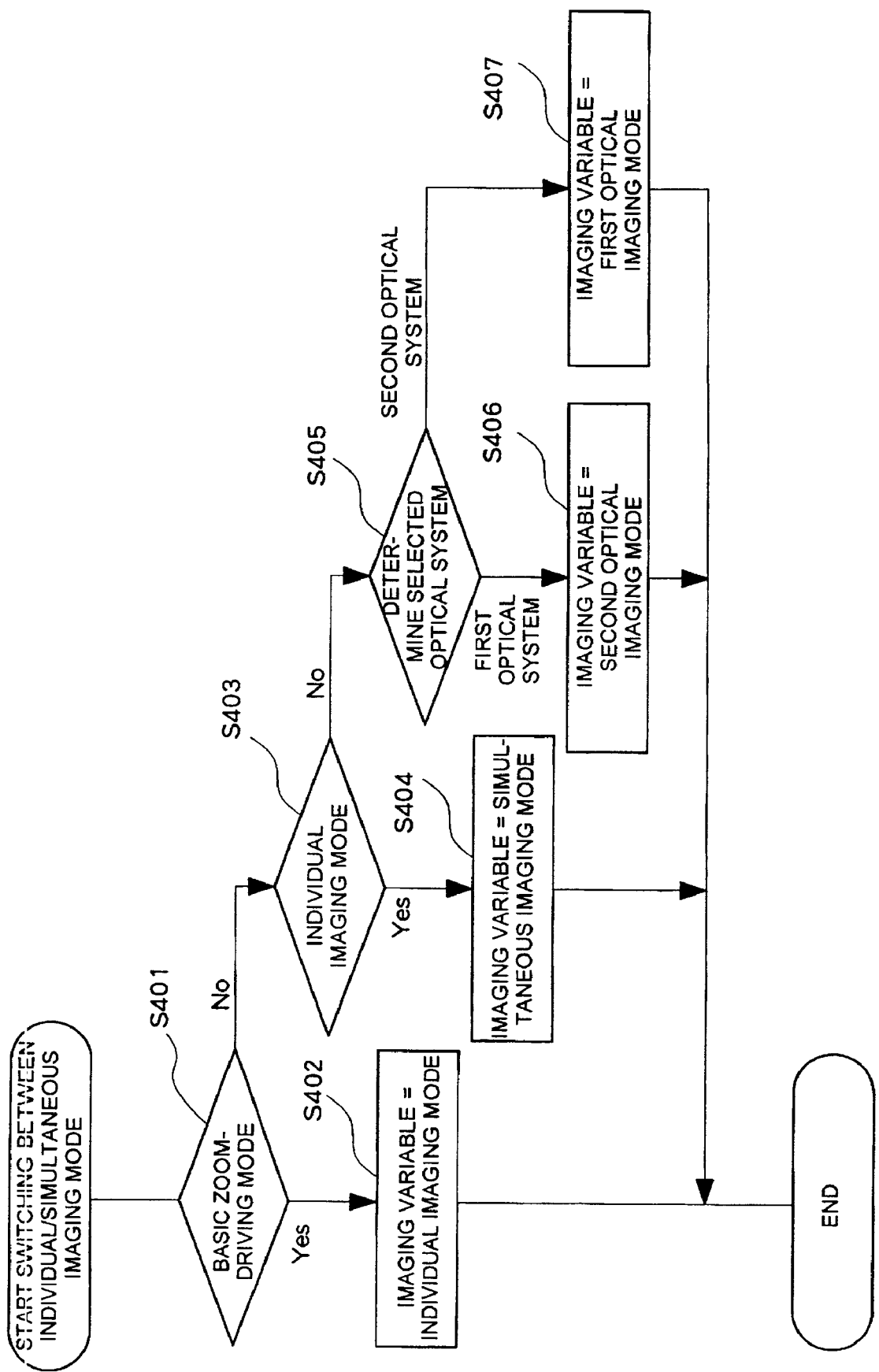
FIG. 6 is a flowchart of individual/simultaneous imaging-switching operation.

FIG. 6 shows a detailed flowchart of individual/simultaneous imaging switching (S400) shown in FIG. 3. The present processing is performed by actuation of the OK button of the four-way key 20. First, a determination is made as to whether or not the current zoom drive mode is the basic drive mode (S401). In the case of the basic drive mode, the first imaging optical system and the second imaging optical system are sequentially, switchingly actuated as if they were a single optical system. Accordingly, an image displayed on the LCD 14 is one image, and individual imaging is maintained at all times. Specifically, the imaging variable is maintained in the individual variable without modification (S402). When the current zoom drive mode is not the basic drive mode, a determination is made as to whether or not the zoom drive mode is an individual drive mode (S403). When the current zoom drive mode is the individual drive mode, the imaging variable is set to simultaneous imaging, and simultaneous imaging is performed (S404). When the current zoom drive mode is not the individual drive mode; namely, when then current zoom drive mode is the simultaneous drive mode, the optical system currently selected as the imaging optical system is determined (S405). When the first imaging optical system is selected, the imaging variable is set in the second imaging optical system, and imaging operation of the second imaging optical system is performed. When the second imaging optical system is selected, the imaging variable is set in the first imaging optical system, and imaging operation of the first imaging optical system is performed (S406, S407).

Figure 7:
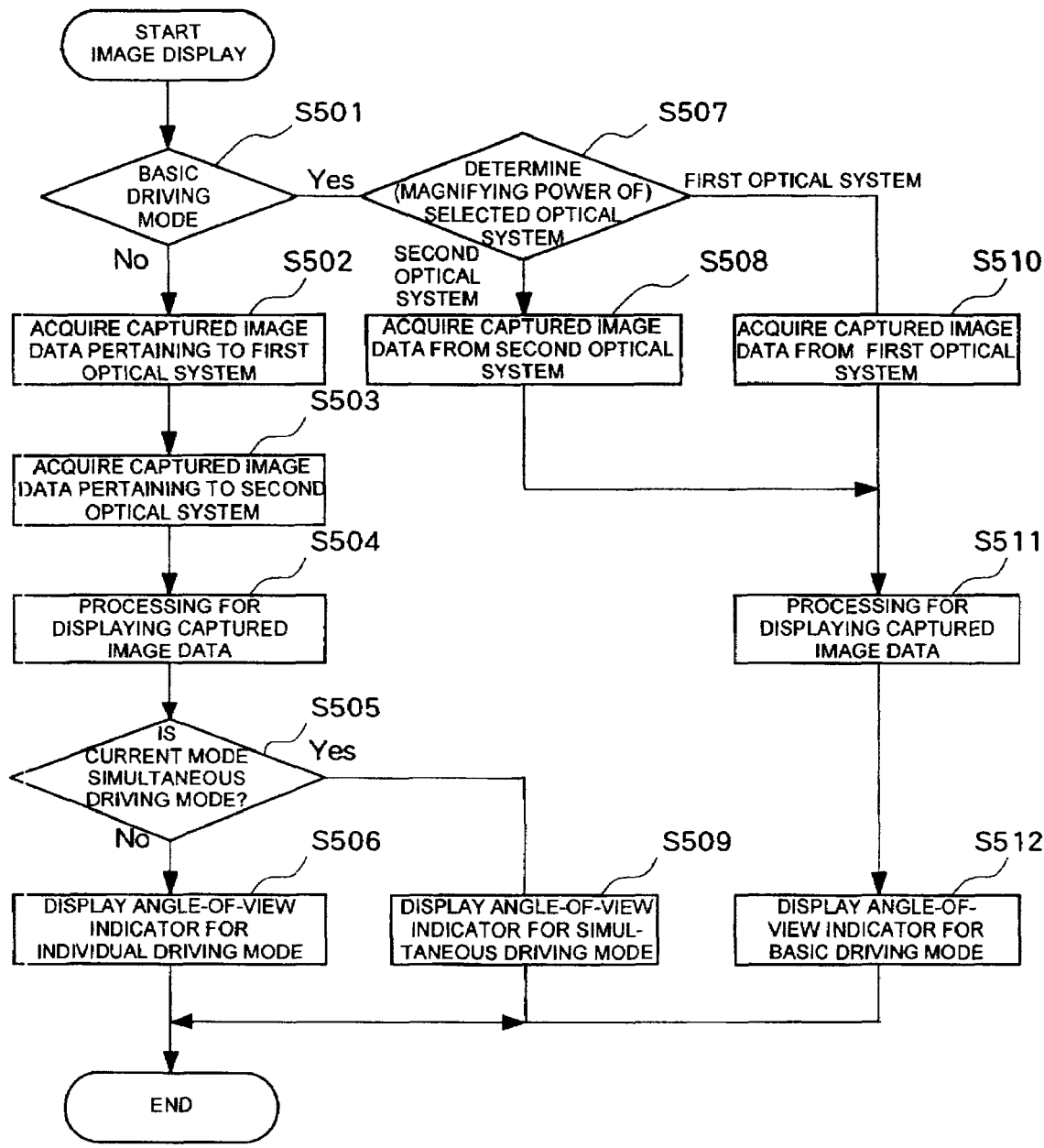
FIG. 7 is a flowchart of image display processing.

FIG. 7 shows a detailed flowchart of image display processing (S500) shown in FIG. 3. When the button is not actuated, the present processing is performed. First, a determination is made as to whether or not the current zoom drive mode is the basic drive mode (S501). When the current zoom drive mode is the basic drive mode, the selected optical system is determined in accordance with the zoom button 16 (S507). When the first imaging optical system is selected, captured-image data; i.e., a first image signal, are acquired from the first imaging optical system (S510). When the second imaging optical system is selected, captured-image data; i.e., a second image signal, are acquired from the second imaging optical system (S508). The thus-acquired image signal is subjected to image processing and displayed on the display circuit 310; namely, the LCD 14 (S511). An indicator corresponding to the basic drive mode is prepared and displayed on the LCD 14 (S512).

Figure 11:
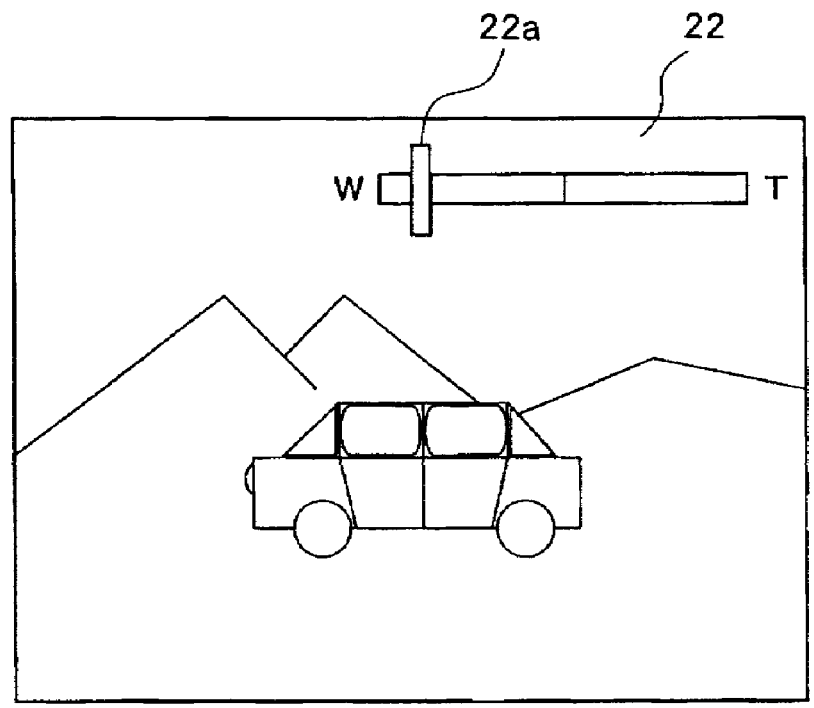
FIG. 11 is a descriptive view of a screen display in a basic drive mode.

FIG. 11 shows an example image displayed in S511 and an example indicator displayed in S512. The example screen is achieved when the first imaging optical system 100 on the wide side is selected. An image formed from the first image signal is displayed on the LCD 14, and an indicator 22 is displayed at a predetermined position on the LCD 14; e.g., an upper right position. In the basic drive mode, the two optical systems are sequentially driven as if they were a single optical system. Therefore, the indicator 22 is also displayed in the form of a single bar from the wide end (W) to the telephotography end (T). The left half of the bar corresponds to the zoom range of the first imaging optical system 100, and the right half of the same corresponds to the zoom range of the second imaging optical system 200. The drawing shows that the current zoom position 22a is displayed and that the first imaging optical system 100 is selected.

Turning again to FIG. 7, when the current zoom drive mode is determined not to be the basic drive mode in S501, the simultaneous drive mode is in the simultaneous drive mode or the individual drive mode. In any mode, both the first imaging optical system 100 and the second imaging optical system 200 operate. Therefore, image data are acquired from the first imaging optical system 100 (S502), and image data are subsequently acquired from the second imaging optical system 200 (S503). The image data are subjected to image processing and displayed on the LCD 14 (S504). When the current zoom drive mode is a simultaneous drive mode (when YES is selected in S505), an indicator corresponding to the simultaneous drive mode is prepared and displayed on the LCD 14 (S509). When the current zoom drive mode is an individual drive mode (when NO is selected in S505), an indicator corresponding to the individual drive mode is prepared and displayed on the LCD 14.

Figure 12:
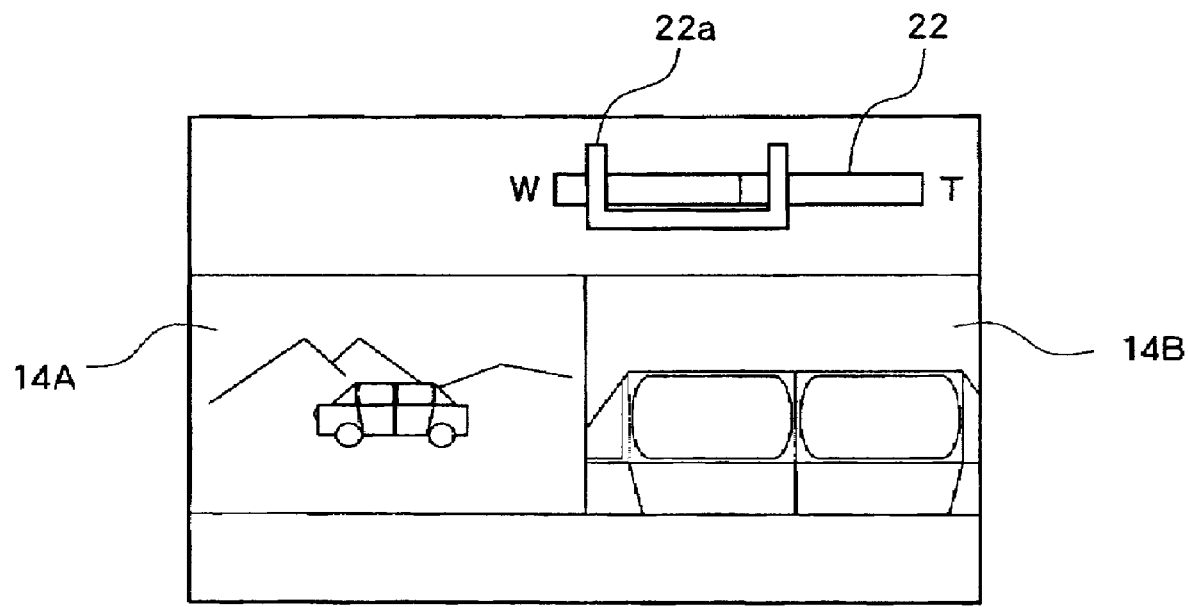
FIG. 12 is a descriptive view of a screen display in a simultaneous drive mode.
Figure 13:
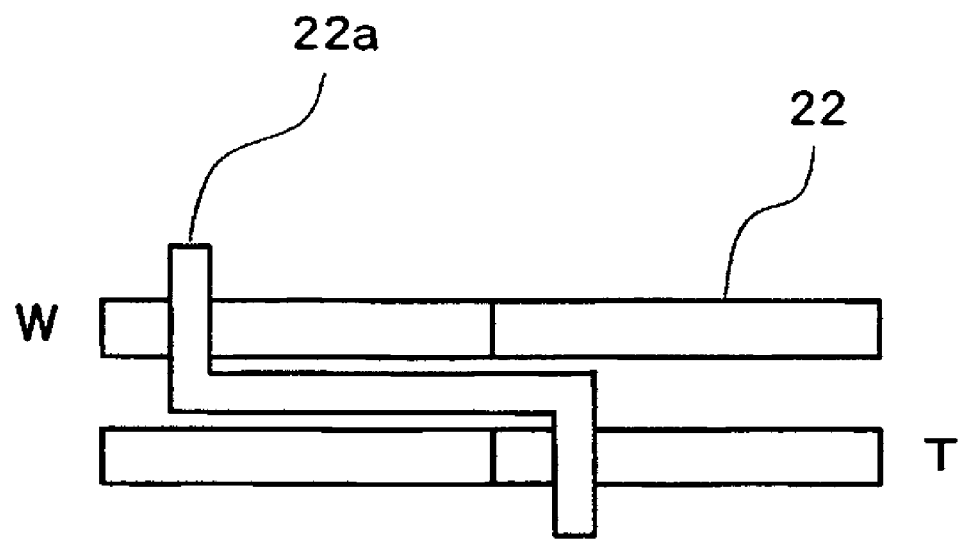
FIG. 13 is a descriptive view of another indicator in the simultaneous drive mode.
Figure 14:
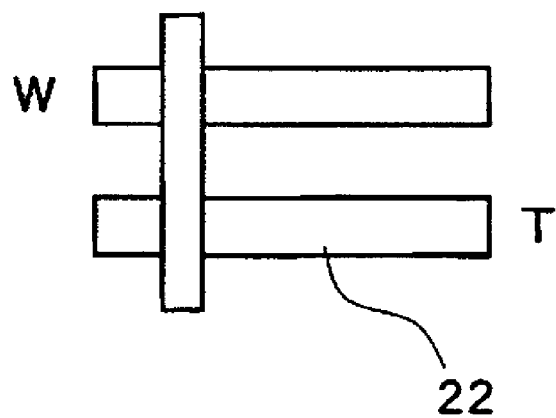
FIG. 14 is a descriptive view of another indicator in the simultaneous drive mode.

FIG. 12 shows an example image displayed in S504 and an example indicator displayed in S509; that is, an example screen display achieved in the simultaneous drive mode. A wide image 14A acquired by the first imaging optical system 100 and a telephotographic image 14B acquired by the second imaging optical system 200 are displayed side by side on the LCD 14. In the drawing, the wide image 14A is an image of an overall vehicle that is a subject, and the telephotographic image 14B is a fragmentary-enlarged image of the vehicle. Meanwhile, the indicator 22 is displayed at the upper right position on the LCD 14. Since simultaneous driving is achieved, the zoom position of the first imaging optical system 100 and the zoom position of the second imaging optical system 200 are integrally displayed as a zoom position 22a. As a result of integral display of the zoom positions, the user can readily ascertain that the first zoom lens 102 and the second zoom lens 202 are simultaneously driven; namely, synchronized operation between the two zoom lenses. The first zoom lens 102 of the first imaging optical system 100 and the zoom lens 202 of the second imaging optical system 200 are synchronized with each other. When the first zoom lens 102 moves from the wide end to the telephotography end, the second zoom lens 202 also moves in the same manner from the wide end to the telephotography end. When the first zoom lens 102 has reached the wide end of the zoom range of the first imaging optical system 100, the second zoom lens 202 also reaches the wide end of the zoom range of the second imaging optical system 200. When the first zoom lens 102 has reached the telephotography end of the zoom lens of the first imaging optical system 100, the second zoom lens 202 also reaches the telephotography end of the zoom range of the second imaging optical system 200. The user can readily ascertain the zoom position of the first imaging optical system 100 and the zoom position of the second imaging optical system 200 by means of visually perceiving the indicator 22. As shown in FIG. 13, in relation to the display pattern of the indicator 22, the first imaging optical system 100 and the second imaging optical system 200 may be displayed in the form of a vertically-two-layered bar, and the zoom range of the first imaging optical system 100 and the zoom range of the second imaging optical system 200 may also be displayed while being horizontally offset from each other. Moreover, the zoom position 22a may also be displayed. Alternatively, as shown in FIG. 14, the zoom ranges may be displayed in the form of a vertically-two-layered bar, and the zoom position 22a may also be displayed while the zoom ranges are vertically aligned with each other. In any event, the zoom position 22a shows a synchronized state of the two zoom lenses.

Figure 15:
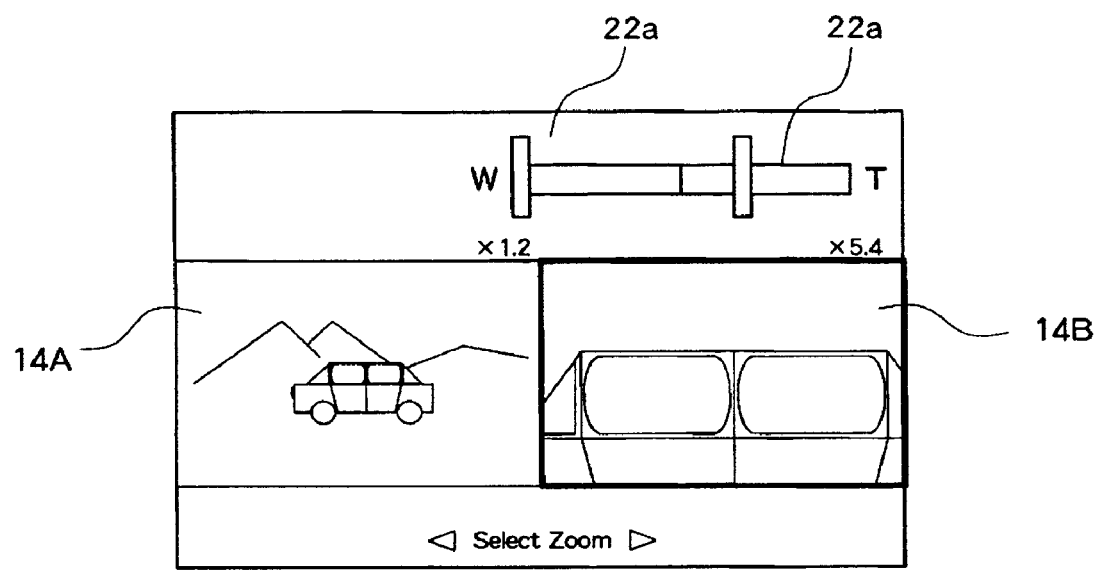
FIG. 15 is a descriptive view of a screen display in an individual drive mode.
Figure 16:
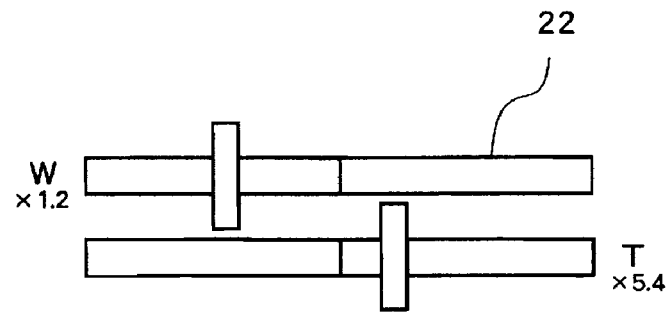
FIG. 16 is a descriptive view of another indicator in an individual drive mode.
Figure 17:
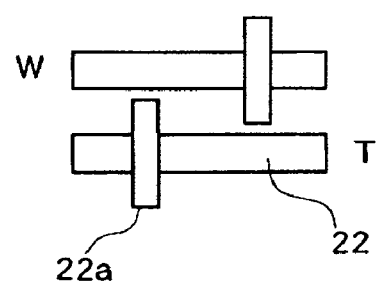
FIG. 17 is a descriptive view of another indicator in the individual drive mode.

FIG. 15 shows an example image displayed in S504 and an example indicator displayed in S506; that is, an example screen display achieved in the individual drive mode. The wide image 14A acquired by the first imaging optical system 100 and the telephotographic image 14B acquired by the second imaging optical system 200 are displayed side by side on the LCD 14. The drawing shows a case where the second imaging optical system 200 is individually driven. In order to indicate that the telephotographic image 14B has been selected, the frame of the telephotographic image 14B is displayed in a thick line or highlighted. The indicator 22 is displayed in the form of a bar, and the zoom position 22a of the individually-driven second imaging optical system 200 is displayed. As shown in FIG. 16, in relation to the display pattern of the indicator 22, the zoom ranges may be displayed in the form of a vertically-two-layered bar while being horizontally offset from each other, and the zoom position 22a may also be displayed. Alternatively, as shown in FIG. 17, the zoom ranges may also be displayed in the form of a vertically-two-layered bar, and the zoom position 22a may also be displayed with the respective zoom ranges being vertically aligned to each other.

As mentioned above, the display pattern of the indicator 22 can be changed in accordance with the zoom drive mode. The user can readily ascertain the current zoom drive mode, and reliably ascertain the zoom position.

Figure 8:
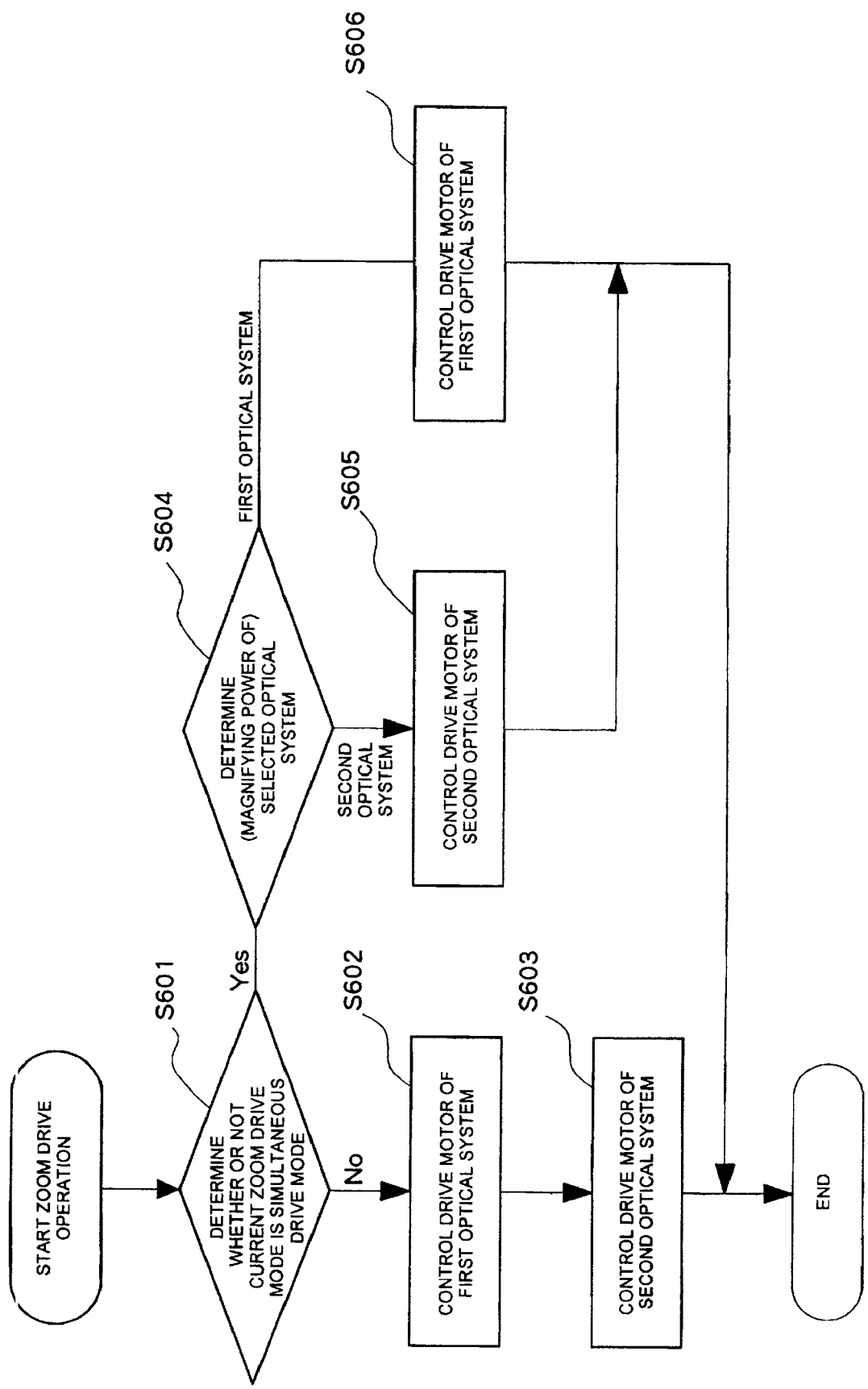
FIG. 8 is a flowchart of zoom drive operation.

FIG. 8 shows a detailed flowchart of zoom drive processing (S600) shown in FIG. 3. This processing is processing performed when the zoom button 16 is actuated. First, a determination is made as to whether or not the current zoom drive mode is a simultaneous drive mode (S601). When the current zoom drive mode is the simultaneous drive mode, the first zoom lens 102 of the first imaging optical system 100 is actuated in response to actuation of the zoom button 16 (S602), and the second zoom lens 202 of the second imaging optical system 200 is actuated (S603). The first zoom lens 102 is actuated by the first zoom drive motor 112, and the second zoom lens 202 is actuated by the second zoom drive motor 216. However, the first zoom lens 102 and the second zoom lens 202 may also be actuated by a common drive motor. For instance, the common drive motor is coupled to a first lead screw as well as to a second lead screw via a gear. A nut is screw-engaged with the first lead screw, and the nut is connected to the first zoom lens 102. Another nut is screw-engaged with the second lead screw, and the second zoom lens 202 is connected to the nut. The first lead screw and the second lead screw are rotationally driven by the common drive motor, thereby actuating the first zoom lens 102 and the second zoom lens. Meanwhile, when the current zoom drive mode is not the simultaneous drive mode; namely, when the current zoom drive mode is the basic drive mode or the individual drive mode, the currently-selected optical system is determined (S604), and the zoom lens of the optical system is actuated (S605, S606). When the first zoom lens 102 and the second zoom lens 202 are individually actuated by the drive motor, individual driving is easy. However, when the first and second zoom lenses are actuated by the common drive motor, provision of a clutch mechanism is preferable. When only the first zoom lens 102 is driven, the clutch that connects the common drive motor to the second zoom lens 202 is released. When only the second zoom lens 202 is actuated, the clutch that connects the common drive motor to the first zoom lens 102 is released.

Figure 9:
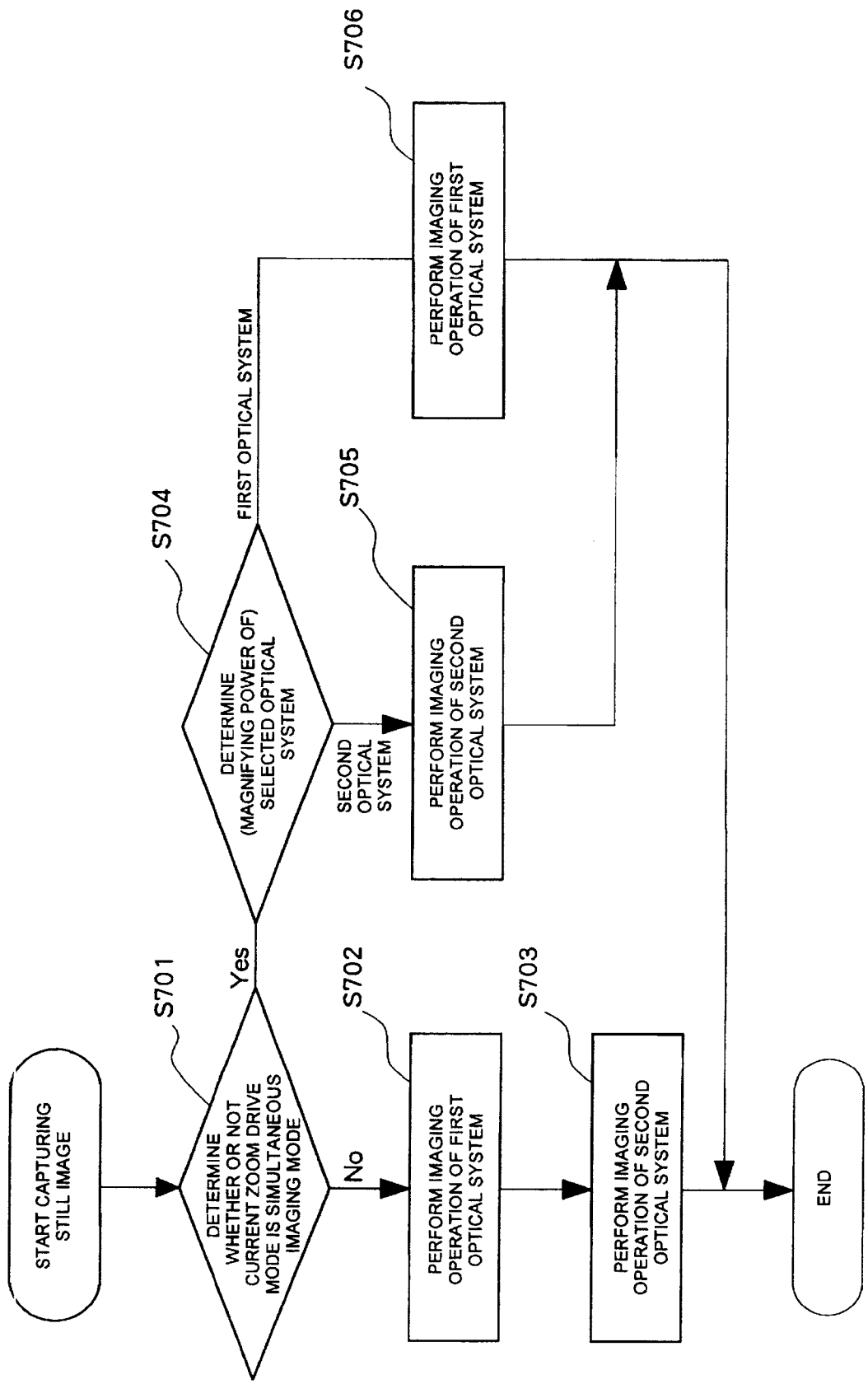
FIG. 9 is an imaging flowchart.

FIG. 9 shows a detailed flowchart of imaging operation (S700) shown in FIG. 3. First, a determination is made as to whether or not the zoom drive mode is a simultaneous imaging mode (S701). When the zoom drive mode is the simultaneous imaging mode, the imaging operation performed by the first imaging optical system 100 is carried out (S702). Next, imaging operation performed by the second imaging optical system 200 is carried out (S703). Meanwhile, when the zoom drive mode is not the simultaneous drive mode, the selected optical system is determined (S704). Imaging operation pertaining to the selected optical system is carried out (S705, S706).

Figure 10:
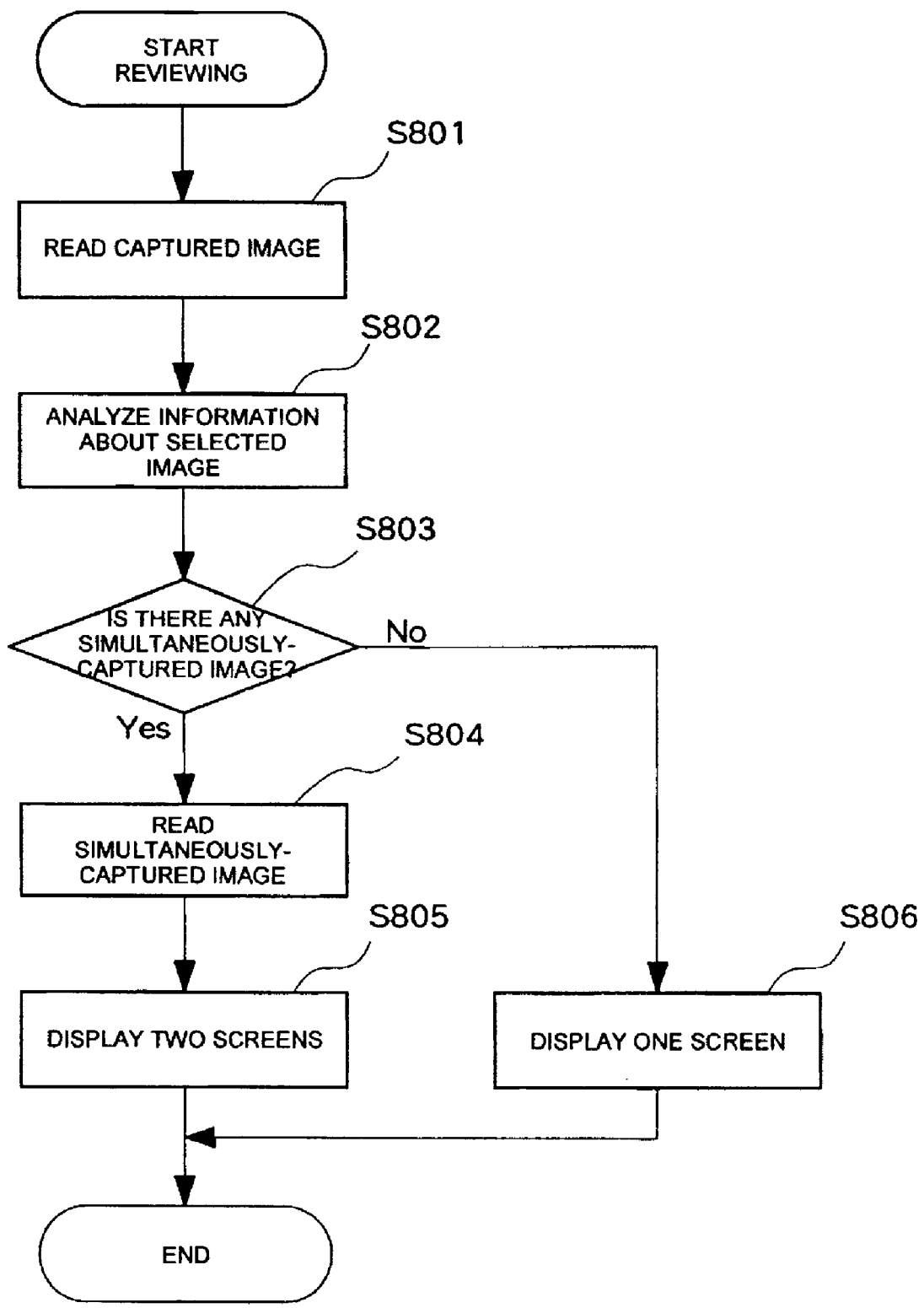
FIG. 10 is a reviewing flowchart.

FIG. 10 is a detailed flowchart of review imaging (S800) in FIG. 3. First, a captured image is read from the storage circuit 320 (S801), and information about the thus-selected image is analyzed (S802). Specifically, a determination is made as to whether or not a simultaneously-captured image is present in the selected image (S803). In the simultaneous drive mode, the image captured by the first imaging optical system 100 and the image captured by the second imaging optical system 200 can be present. When imaging operation is performed in S702 and S703 shown in FIG. 9, presence of a simultaneously-captured image and information used for specifying the image are added as a tag to each of the images. By reference to the tag, a determination can be made as to whether or not another simultaneously-captured image is present in connection with the selected image. When the simultaneously-captured image is present (when YES is selected in S803), the simultaneously-captured image is read from the storage circuit 320 (S804). The two images are displayed side by side on the LCD 14 (S805). Meanwhile, when the simultaneously-captured image is not present (when NO is selected in S803), only one selected image is displayed on the LCD 14 (S806).

As mentioned above, the present embodiment adopts the configuration where the zoom drive mode is switched. The indicators 22 corresponding to the respective zoom drive modes are displayed on the LCD 14, so that the convenience of the user can be enhanced. Moreover, the images captured by the two optical systems having different zoom angle-of-view ranges can be simultaneously ascertained on the LCD 14. Accordingly, rendering a determination whether to switch the optical system is facilitated, so that enhanced operability is achieved.

The embodiments of the present invention have been described thus far. However, the present invention is not limited to the embodiments and is liable to various modifications.

Figure 18:
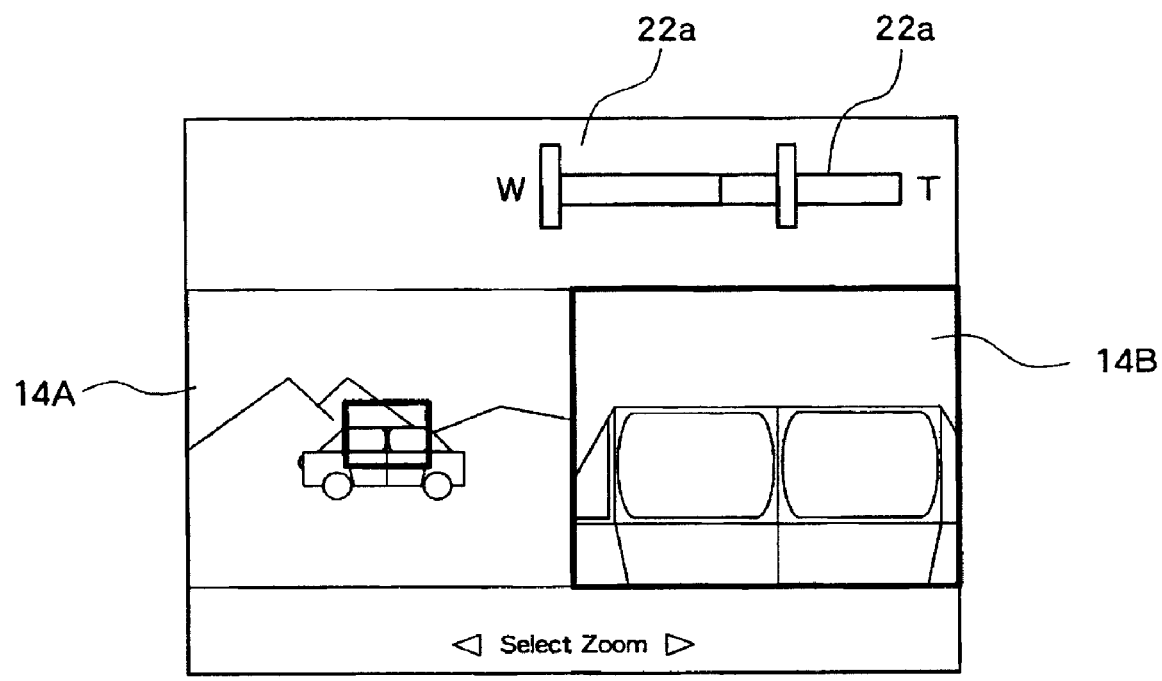
FIG. 18 is a descriptive view of another screen display in the individual drive mode.
Figure 19:
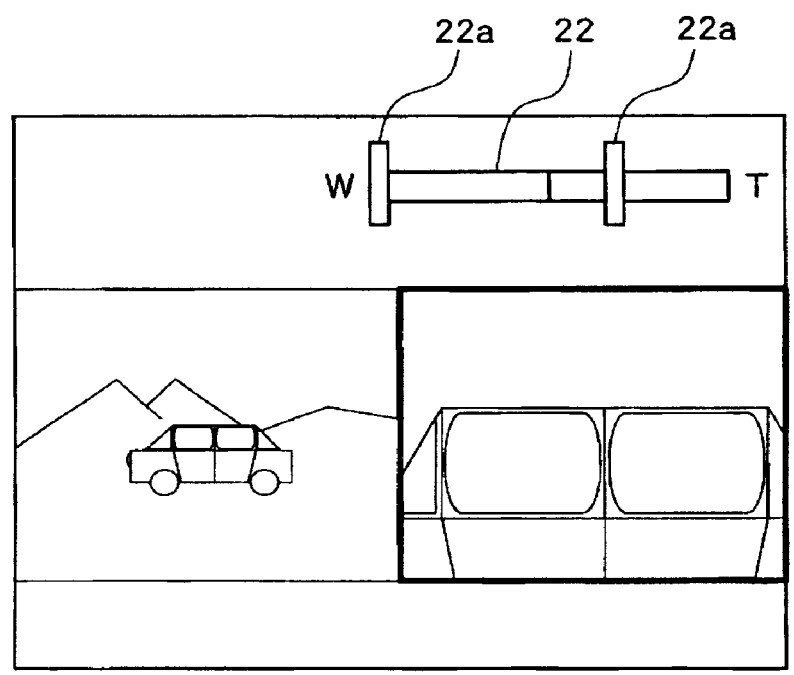
FIG. 19 is a descriptive view of a screen display in the simultaneous drive mode.
Figure 20:
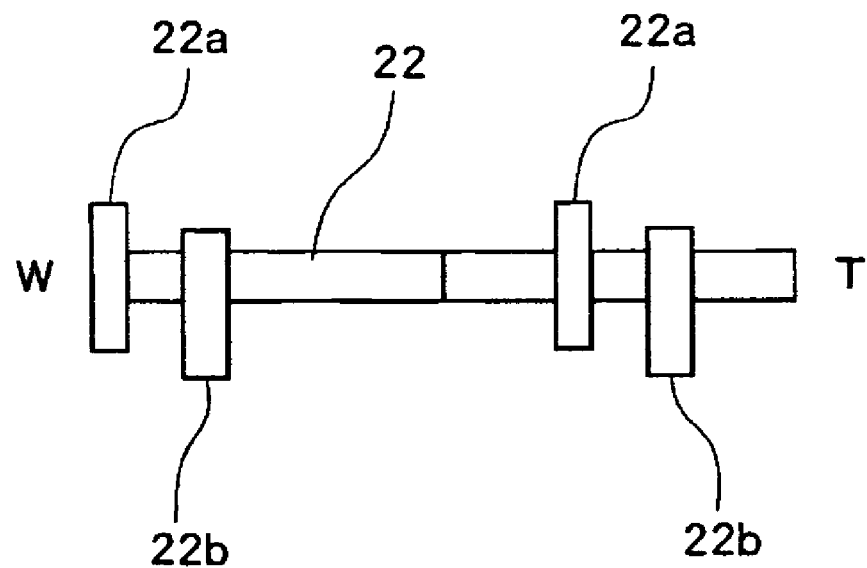
FIG. 20 is a descriptive view of another indicator in the simultaneous drive mode.

For example, when the zoom drive mode is an individual drive mode, a screen display such as that shown in FIG. 18 may also be provided. Specifically, the angle-of-view position of the telephotographic image 14B is displayed in a thick line or highlighted on the wide screen 14A. In the case of the simultaneous drive mode, as shown in FIG. 19, the indicator 22 may also be embodied in the form of such a display pattern as to display the zoom position 22a of each of the imaging optical systems. When each of the imaging optical systems has a digital zoom, a digital zoom position 22b may also be displayed in addition to the optical zoom position 22a as shown in FIG. 20.

Figure 21:
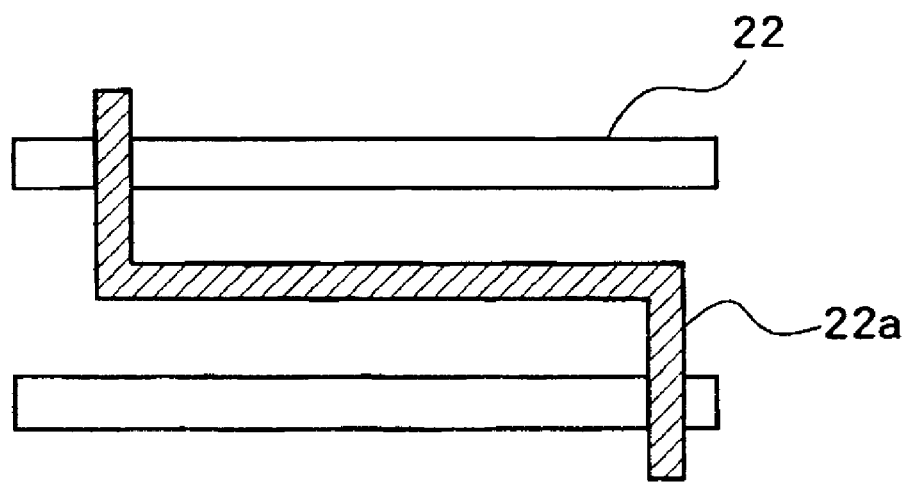
FIG. 21 is a descriptive view of yet another indicator in the simultaneous drive mode.

In the present embodiment, in the case of the simultaneous drive mode, when the first zoom lens 102 and the second zoom lens 202 move in the same direction along the direction of the optical axis; namely, when the first zoom lens 102 moves from the wide end to the telephotography end, the second zoom lens 202 is also configured so as to move from the wide end to the telephotography end. However, when the first zoom lens 102 and the second zoom lens 202 move in opposite directions along the direction of the optical axis; namely, when the first zoom lens 102 moves from the wide end to the telephotography end, the second zoom lens 202 may also be configured so as to move from the telephotography end to the wide end. Any of the configurations may also be switched. In this case, it goes without saying that the display pattern of the indicator 22 is changed in accordance with switching between the configurations. The display pattern is as shown in, e.g., FIG. 21. By comparison with FIG. 14, a difference between the display patterns of the indicator 22 is obvious. By means of comparing FIG. 14 with FIG. 21, the user can readily ascertain whether or not driving is in the same direction or in opposite directions.

PARTS LIST

10 power button
12 release button
14 LCD
14A wide image
14B telephotographic image
16 zoom button
18 review button
20 four-way key
22 indicator
22a optical zoom position
22b digital zoom position
100 first imaging optical system
102 first zoom lens
104 first focus lens
106 first aperture-and-shutter
108 first image sensor
110 imaging control circuit
112 zoom control motor
114 focus control motor
116 aperture-and-shutter control motor
200 second imaging optical system
202 second zoom lens
204 second focus lens
206 second aperture-and-shutter
208 second image sensor
210 image control circuit
212 aperture-and-shutter control motor
214 focus control motor
216 zoom control motor
300 central control circuit
310 display circuit
320 storage circuit
330 motor control circuit
340 button operation circuit
S100 step
S200 step
S300 step
S301 step
S302 step
S303 step
S304 step
S400 step
S401 step
S402 step
S403 step
S404 step
S405 step
S406 step
S407 step
S500 step
S501 step
S502 step
S503 step
S504 step
S505 step
S506 step
S507 step
S508 step
S509 step
S510 step
S511 step
S512 step
S600 step
S601 step
S602 step
S603 step
S604 step
S605 step
S606 step
S700 step
S701 step
S702 step
S703 step
S704 step S705 step
S706 step
S800 step
S801 step
S802 step
S803 step
S804 step
S805 step
S806 step
S900 step

The invention claimed is:

1. An imaging apparatus having multiple optical systems, comprising:
   a first imaging optical system;
   a second imaging optical system differing from the first imaging optical system in terms of an angle of view,
   the first imaging optical system having a first zoom lens for zooming purpose,
   the second imaging optical system having a second zoom lens for zooming purpose, and
   the first zoom lens and the second zoom lens having a plurality of different drive modes; and
   a display control showing an indicator which simultaneously shows both a zoom position of the first zoom lens and a zoom position of the second zoom lens in accordance with whichever of the drive modes of the first zoom lens and the drive mode of the second zoom lens is active.

2. An imaging apparatus having multiple optical systems, comprising:
   a first imaging optical system;
   a second imaging optical system differing from the first imaging optical system in terms of an angle of view,
   the first imaging optical system having a first zoom lens for zooming purpose,
   the second imaging optical system having a second zoom lens for zooming purpose, and
   the first zoom lens and the second zoom lens having a plurality of drive modes; and
   a display control showing an indicator which shows a zoom position of at least any of the first zoom lens and the second zoom lens in accordance with a pattern corresponding to each of the drive modes, and
   wherein the plurality of drive modes include a synchronous mode of synchronously actuating the first zoom lens and the second zoom lens and an individual mode of individually actuating the first lens and the second lens, and wherein the indicator shows a status of synchronization along with a zoom position of the first zoom lens and a zoom position of the second zoom lens achieved in the synchronous mode.

3. The imaging apparatus having a plurality of optical systems according to claim 2, wherein the display control simultaneously displays an image captured by the first zoom lens and an image captured by the second zoom lens in conjunction with the indicator.

4. The imaging apparatus having a plurality of optical systems according to claim 2, wherein the plurality of drive modes include a mode of sequentially actuating the first zoom lens and the second zoom lens in accordance with a magnifying power specified by a user; a simultaneous drive mode of simultaneously driving the first zoom lens and the second zoom lens; and an individual drive mode of individually actuating the first zoom lens and the second zoom lens.

5. The imaging apparatus having a plurality of optical systems according to claim 2, wherein the indicator shows the zoom position of the zoom lens individually actuated in the case of the individual drive mode.

6. An imaging apparatus having multiple optical systems, comprising:
   a first imaging optical system;
   a second imaging optical system differing from the first imaging optical system in terms of an angle of view;
   the first imaging optical system having a first zoom lens for zooming purpose;
   the second imaging optical system having a second zoom lens for zooming purpose; and
   a display control displaying an indicator simultaneously showing respective zoom positions of the first zoom lens and the second zoom lens concurrently with a wide angle image captured by the first zoom lens and a telephoto image captured by the second zoom lens.

7. The imaging apparatus having a plurality of optical systems according to claim 6, wherein the first zoom lens and the second zoom lens are simultaneously actuated.

8. The imaging apparatus having a plurality of optical systems according to claim 6, wherein the first zoom lens and the second zoom lens are individually actuated.

* * * * *